United States Patent [19]
King

[11] Patent Number: 4,781,396
[45] Date of Patent: Nov. 1, 1988

[54] COLLAPSIBLE WHEELBARROW

[76] Inventor: David H. King, 'Greenways', Brick Kiln Lane, Suffield, Norwich, Norfolk, England

[21] Appl. No.: 59,965

[22] Filed: Jun. 9, 1987

[51] Int. Cl.⁴ .............................................. B62B 1/20
[52] U.S. Cl. .................................. 280/653; 280/47.31
[58] Field of Search ..................... 280/653, 47.31, 47.3

[56] References Cited
U.S. PATENT DOCUMENTS 2,471,462  5/1949  Toth ..................................... 280/653
3,552,760  1/1971  Sine ..................................... 280/653

FOREIGN PATENT DOCUMENTS 331751  1/1921  Fed. Rep. of Germany ... 280/47.31
2179304  3/1987  United Kingdom ............. 280/47.31

Primary Examiner—David M. Mitchell
Attorney, Agent, or Firm—Weingram & Zall

[57] ABSTRACT

A collapsible wheelbarrow has two side sections each of which has a generally rectangular load-containing wall, the two walls being hinged together about their lower edges. A tube projects forwardly from each wall to serve as a wheel support, and rearwardly to serve as a handle. A triangular front wall is pivoted to the two walls, the front wall being in two parts which are hinged together. The wheelbarrow may be opened out for normal use, or may be folded so as to be substantially flat, for storage or transport.

7 Claims, 2 Drawing Sheets

COLLAPSIBLE WHEELBARROW

BACKGROUND OF THE INVENTION

1. Field of the Invention

This invention relates to wheelbarrows, and in particular to a wheelbarrow which may be collapsed, for storage or transport purposes, and which may be opened out for use in carrying goods.

2. Description of the Prior Art

There has over the years been a great number of different designs for wheelbarrows, most of which are in the form of rigid structures the volume of which cannot be reduced, for example if the wheelbarrow is to be transported from one place to another, when empty. Some designs permit at least partial dis-assembly, primarily with the intention of assisting the storage and transportation of a number of such wheelbarrows, prior to their sale to end users: when however such a wheelbarrow has been assembled for the first time, it would not ordinarily be dismantled again for any purpose.

A complete wheelbarrow, though relatively light, nevertheless is a relatively bulky object and so the storage of a considerable number of wheelbarrows is inconvenient for example by the original manufacturer, a wholesaler or a retailer. Transportation of a number of such wheelbarrows is not particularly economic, and for the end user, may at best be inconvenient, if at all possible.

A further disadvantage of a conventional wheelbarrow is that most frequently it is left outside in all weathers, in view of the space required to store it when not in use for instance in a garage or garden shed. Inevitably, this leads to more rapid deterioration of the wheelbarrow than would be the case were it stored indoors, when not in use.

OBJECTS OF THE INVENTION

It is a principal object of the present invention to provide a wheelbarrow which may be collapsed to occupy a small volume whenever the wheelbarrow is to be stored or transported, but which may be unfolded to give good carrying capacity whenever the wheelbarrow is to be used.

A further object of the invention is to provide a wheelbarrow which may be folded when not in use to form a relatively flat near two-dimensional mass, so assisting storage.

Yet another object of the invention is to provide a wheelbarrow the width of which may be reduced when in use in carrying loads, to assist manoeuvrability in confined areas.

A yet further object of the invention is to provide a wheelbarrow which has economic advantages for the manufacturer, wholesaler and retailer, in that storage and transport costs for a number of such wheelbarrows may greatly be reduced as compared to conventional rigid wheelbarrows.

Another object of the invention is to provide a wheelbarrow which may be folded flat or opened out by the user with great facility, there being no complex locks, screws or other fastenings requiring attention during such folding or unfolding actions.

Other and further objects and advantages of the invention will become apparent from the following description of the invention.

SUMMARY OF THE INVENTION

According to this invention, there is provided a collapsible wheelbarrow which comprises first and second side sections each having a load-containing wall, a wheel support part extending from one end of the load-containing wall, a handle part extending from the opposite end of the load-containing wall, the load-containing walls of the two side sections having lower edges which are connected for relative pivotal movement about an axis extending generally in or parallel to the planes of the two load-containing walls, a foldable front wall pivoted to both load-containing walls at or adjacent their respective said one ends, and a rotatably-mounted wheel carried by said two wheel support parts, the wheelbarrow being arranged to permit collapsing movement from an opened-out position by relatively pivoting the two side sections until the two load-containing walls lie side-by-side, the front wall simultaneously being folded to lie generally in the same plane as the two load-containing walls.

It will be appreciated that the collapsible wheelbarrow of this invention may assume either one of two positions: in the opened-out position the wheelbarrow generally is similar to certain designs of conventional wheelbarrow and so may be used for carrying various loads, but in the collapsed position the overall volume of the wheelbarrow is relatively small, as compared to the normal width of a conventional wheelbarrow, and is substantially two-dimensional. This of course greatly assists the storage of the wheelbarrow for instance by the original manufacturer, a vendor or the end user, when it is not required for load carrying. The wheelbarrow also is very much more convenient to transport, whether in bulk, or singly for example in a private motor car.

A further advantage of the wheelbarrow is that in areas of restricted space and whilst carrying certain loads, the wheelbarrow may partially be collapsed without the user stopping, by bringing the handles closer together and thus reducing the overall width of the wheelbarrow.

BRIEF DESCRIPTION OF THE DRAWINGS

In order that the invention may better be understood, it will now be explained in greater detail, and one specific embodiment of the invention will be described by way of example, referring as necessary to the drawings, in which.

DESCRIPTION OF THE PREFERRED EMBODIMENTS

Figure 1:
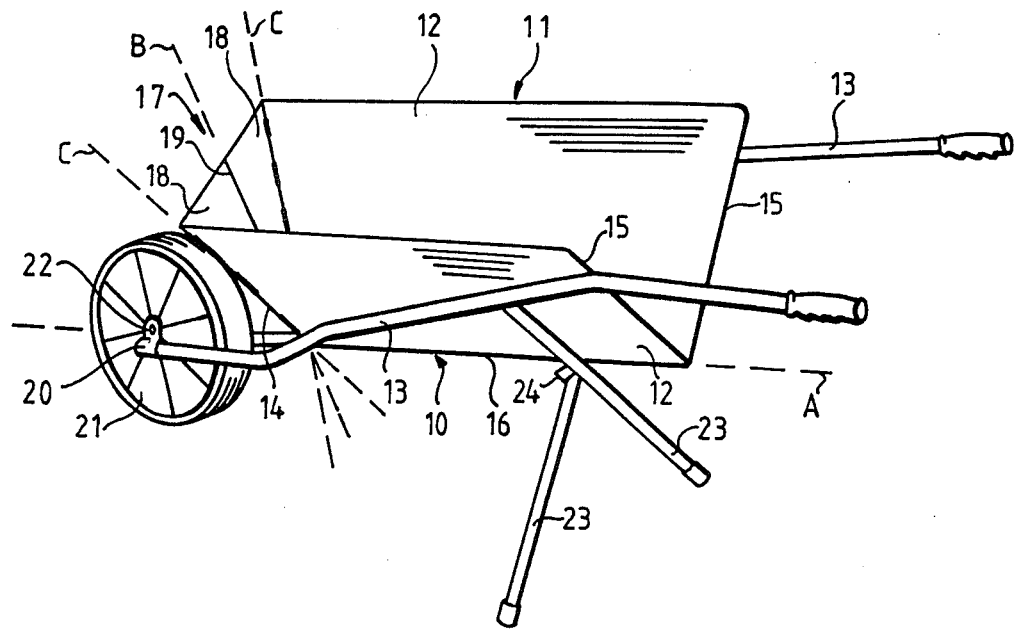
FIG. 1 is a diagrammatic perpsective view of the wheelbarrow, in its opened-out position.

In a wheelbarrow of this invention, it is most preferred for the load-containing wall of each side section to be of generally rectangular shape, though it will be appreciated that side walls of different shapes may be employed, depending upon the overall configuration that the opened-out wheelbarrow is required to assume. Each side wall may nevertheless be essentially planar and have a linear lower edge extending for at least part of the overall length of the side wall from its one end to its opposite end, in order that said pivotal connection may be effected along that lower edge. Conveniently, the pivotal connection is made directly between the lower edges of the walls, for example by using a hinge member attached to both walls or by forming the walls in an appropriate manner so that they may directly be hinged one to the other. Though it will be appreciated that a separate hinged section could be provided, attached to each load-containing wall in an appropriate manner so as to permit those two walls to be pivoted one relative to the other.

Each wheel support part preferably comprises at least one arm extending forwardly from the associated load containing wall, the arm having at its end remote from the wall a mounting for the rotatable wheel of the wheelbarrow. A shaft for the wheel may thus pass through the two mountings, with an appropriate degree of freedom provided to accommodate the relative movement which occurs between the two arms as the wheelbarrow is moved between its opened-out position and its collapsed position. For example, the mountings for the shaft could comprise rose joints attached to the wheel support arms, but in a simpler arrrangement, the wheel support arms may carry mountings having holes of a sufficient size to permit said relative movement to take place. Another possibility is to mount brackets for the wheel shaft on the arms in such a manner that the arms may turn with respect to the brackets. Whichever arrangement is employed, it is most preferred for a projection of the pivotal axis of the two load supporting walls substantially to pass through the region of the wheel axis, to minimise the movement which occurs on opening out or collapsing the wheelbarrow.

The foldable front wall of the wheelbarrow advantageously is, when unfolded, of generally triangular form, so as completely to fill the V-shaped space between the two load-containing walls when pivoted apart. Though the folding of this wall could be arranged in a variety of ways, it is preferred for the foldable front wall to be formed in two similar triangular parts, each pivoted along one of its edges to the front edge of the adjacent load-containing wall and along another edge to the similar edge of the other triangular part. By having all these hinge axes intersecting the pivotal axis of the two load containing walls, collapsing of the wheelbarrow may simply be performed, the two parts of the front wall pivoting to lie side-by-side as the two load-containing walls also are pivoted to lie side-by-side.

The handle parts of the first and second side sections may simply comprise bars projecting rearwardly away from the load-containing walls. In a preferred embodiment, the wheel support arms and handles are formed, for each side section, from a single piece of material attached to and projecting beyond both ends of the associated load-containing wall. In addition, it is convenient for each side section to include a leg portion projecting downwardly therefrom, in order that the wheelbarrow may stand stably in its opened-out position, when not being wheeled from place to place.

Reference will now be made to the specific embodiment of wheelbarrow of this invention illustrated in the drawings and which includes many of the above-mentioned preferred features.

This collapsible wheelbarrow comprises two similar side sections 10 and 11 each comprising a generally rectangular load-containing wall 12 and a rigid tube 13 attached to the wall 12 so as to extend thereacross and project beyond both the front edge 14 and rear edge 15 of the wall 12. As shown in the drawings, the free end of the tube projecting beyond the rear edge 15 serves as a handle for the wheelbarrow, and so may be provided with an appropriate hand-grip, whereas the free end of the tube projecting beyond the front edge 14 of the wall 12 serves as a wheel support part, to be described in more detail below.

The lower long edges 16 of the two load-containing walls 12 are pivoted together so that the two side sections 10 and 11 may be pivoted relatively about the axis A shown in FIG. 1. The pivotal connection between the two walls may be effected by means of a separate hinge member (not shown) attached to both walls 12, or alternatively the two walls may appropriately be formed along their lower edges in order to permit direct hinging of one to the other.

A foldable front wall 17 of generally triangular shape is hinged along two of its edges respectively to the front edges 14 of the two load-containing walls 12, again either by means of separate hinge members or by appropriately forming the edges of the respective walls to permit the direct hinging thereof. The front wall 17 is in two similar parts 18 hinged together about their adjacent edges 19, and the arrangement should be such that the hinge axes B and C, respectively between the front wall parts 18 and between those parts and the load containing walls 12, all intersect at substantially the same point on axis A, referred to above.

At the end of each tube 13 projecting beyond the front edge 14 of the associated load-containing wall 12, there is provided a wheel mounting bracket 20, wheel 20 being rotatably mounted on a shaft extending between the two brackets 20. Each tube 13 may turn with respect to its bracket 20 about an axis essentially parallel to and adjacent a projection of axis A. In this way, the movement of the tubes 13 adjacent the wheel is minimised during opening out or collapsing of the wheelbarrow. In order to improve wheel stability, the turning angle between each tube 13 and its bracket 10 may be restricted.

A leg 23 is attached to each load-containing wall 12, which leg 23 projects downwardly, such that the collapsible wheelbarrow when opened-out as shown in FIG. 1 may stand stably on a flat surface. A stop arrangement including plate 24 to abut the other leg is provided to limit opening-out movement of the wheelbarrow.

Figure 2:
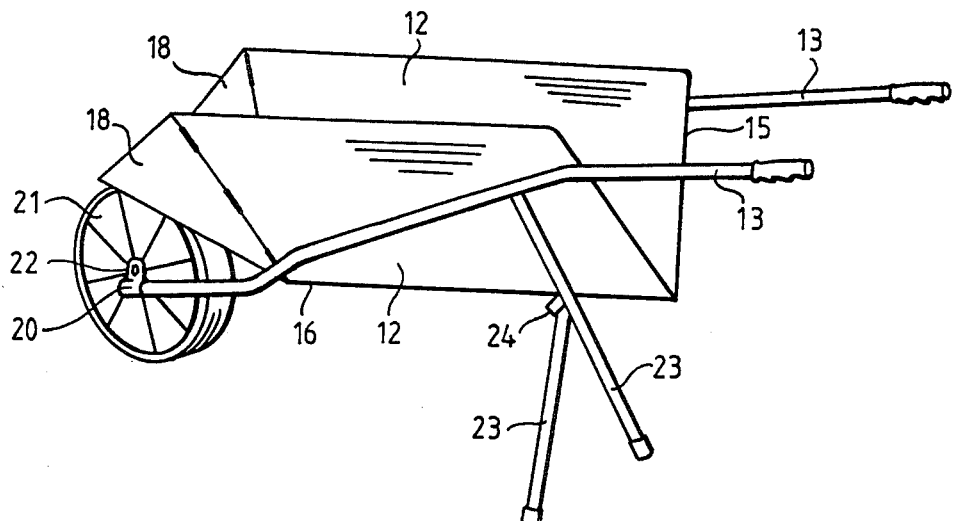
FIG. 2 is a similar view of the same wheelbarrow, but when partially collapsed.
Figure 3:
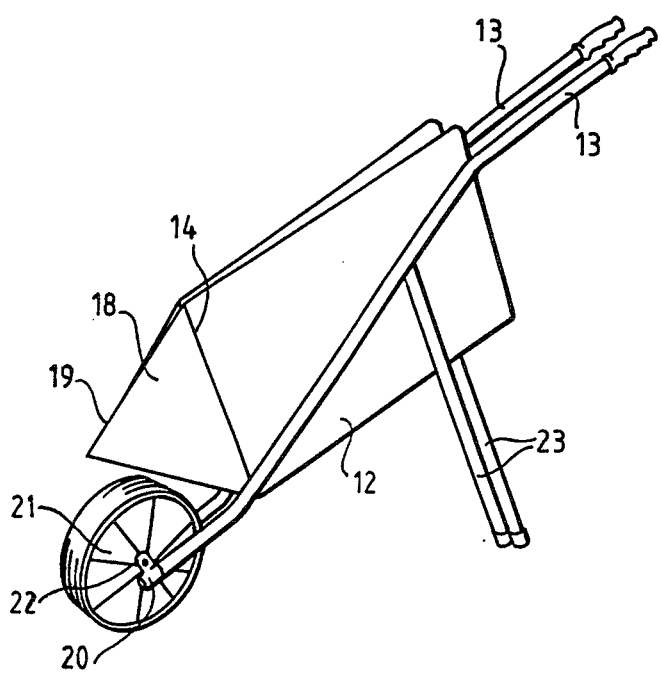
FIG. 3 is a further view of the wheelbarrow, but in its fully collapsed position.

Collapsing of the wheelbarrow from the opened-out configuration shown in FIG. 1 is easily achieved, initially by pressing the front wall 17 towards the wheel 21, so as to commence the folding together of the two front wall parts 18, whilst simultaneously moving together the two side sections 10 and 11, for example by squeezing together the two handle projections of the tubes 13. This first stage is illustrated in FIG. 2 of the drawings. Continued pressure on the two side sections 10 and 11 will move the two load-containing walls 12 closer together until they lie substantially side-by-side, as then do the two front wall parts 18; this collapsed configuration is shown in FIG. 3, and it will be appreciated that when so collapsed, the wheelbarrow occupies a very narrow space, as compared to the normal width of the wheelbarrow when opened-out.

It will also be appreciated that with the two parts 18 of the foldable front wall arranged generally co-planar, as illustrated in FIG. 1, those parts resist collapsing movement of the two side sections. In order to increase the security of the wheelbarrow when opened out in this way, a lock arrangement (not shown) may be provided to maintain the two front wall parts 18 substantially co-planar. The lock would then have to be released before collapsing of the wheelbarrow may be commenced.

A further possibility is to provide a second foldable wall (not shown) essentially the same as the foldable front wall 17, but pivoted to the two rear edges 15 of the two load containing walls 12, respectively. This may enable the wheelbarrow to be used more conveniently for carrying certain loads, without requiring any greater space for the wheelbarrow, when collapsed.

It will be understood that various changes may be made to the details and arrangement of the wheelbarrow as described above without departing from the spirit and scope of the present invention, as defined by the appended claims.

I claim:

1. A collapsible wheelbarrow which comprises first and second sections each having a load-containing wall, a wheel support part extending from one end of each said load-containing wall, a handle part extending from the opposite end of each said load-containing wall, said load-containing wall of said side sections having lower edges which are directly hinged together for relative pivotal movement about a first axis extending substantially in the planes of said two load-containing walls, a generally triangular front wall pivoted to both said load-containing walls at or adjacent their respective said one ends, said front wall being foldable about a second axis passing through said first axis and dividing said front wall into two substantially similar triangular portions, and a rotatably-mounted wheel carried by said two wheel support parts, the wheelbarrow being arranged to permit collapsing movement from an opened-out position by relatively moving the two handle parts closer together so pivoting the two side sections about said first axis until the two load-containing walls lie side-by-side, the front wall simultaneously being folded about said second axis to lie generally in the same plane as the two load-containing walls.

2. A wheelbarrow according to claim 1, wherein said load-containing wall of each said side section is of generally rectangular shape, and is substantially planar with a linear lower edge extending for at least part of the overall length of the side wall from its said one end to its said opposite end.

3. A wheelbarrow according to claim 1, wherein each said wheel support part comprises at least one arm extending forwardly from the associated load-containing wall, the arm having at its end remote from the wall a mounting for said rotatable wheel of the wheelbarrow.

4. A wheelbarrow according to claim 3, wherein there is provided a shaft for the wheel, the shaft passing through the two mountings with an appropriate degree of freedom provided to accommodate the relative movement which occurs between the two arms as the wheelbarrow is moved between an opened out position and a collapsed position.

5. A wheelbarrow according to claim 4, wherein a projection of said pivotal axis of the two load supporting walls substantially passes through the region of the wheel axis.

6. A wheelbarrow according to claim 1, wherein the wheel support arms and handle parts for each side section are formed integrally and attached to the associated load-containing walls, to project beyond both ends thereof.

7. A collapsible wheelbarrow which comprises first and second side sections each having a load-containing wall of generally rectangular shape with a linear lower edge, a pair of wheel supporting arms projecting one from each load-containing wall from one end thereof, a pair of handle arms projecting one from each load-containing wall from the opposite end thereof to the wheel-supporting arms, said lower edges of the load-containing walls being pivotally connected together for relative movement about an axis extending generally in the planes of said two load-containing walls, a triangular front wall pivoted to both said load-containing walls at or adjacent their respective said one ends, the triangular front wall being formed from two similar triangular parts each pivoted along one of its edges to the one end of the adjacent load-carrying wall and along a second edge to the similar second edge of the other triangular part whereby the front wall may be folded by relative pivoting movement of the two triangular parts, a shaft carried by the wheel-supporting arms and a wheel rotatably mounted on said shaft, the wheelbarrow being arranged to permit collapsing movement from an opened-out position by relatively pivoting the two side sections until the two load-containing walls lie side-by-side, the triangular parts of said front wall simultaneously being folded to overlie each other and to lie generally in the same plane as the two load-containing walls.

* * * * *